United States Patent [19]
Schneider

[11] 3,777,672
[45] Dec. 11, 1973

[54] RAILWAY CAR SUSPENSION
[75] Inventor: Felix Schneider, Netphen Eckmannshausen, Germany
[73] Assignee: Rheinstahl AG, Kassel, Germany
[22] Filed: Dec. 20, 1971
[21] Appl. No.: 210,058

[30] Foreign Application Priority Data
Dec. 19, 1970 Germany............. P 20 62 797.8

[52] U.S. Cl. .......... 105/453, 105/199 S, 105/224.1, 267/3, 267/57.1 R, 267/63 A, 280/104.5 R
[51] Int. Cl. .......... B61f 3/00, B61f 5/30, F16f 1/48
[58] Field of Search ............ 105/157, 199 R, 199 S, 105/224.1, 353; 267/57.1 R, 63 A, 3; 280/104.5 A, 104.5 R

[56] References Cited
UNITED STATES PATENTS

| | | | |
|---|---|---|---|
| 3,013,808 | 12/1961 | Willetts........................ | 280/104.5 A |
| 2,137,543 | 11/1938 | Piron ........................... | 105/224.1 |
| 2,069,270 | 2/1937 | Piron ........................... | 267/63 A |
| 2,033,864 | 3/1936 | Piron ........................... | 267/63 A X |
| 2,216,455 | 10/1940 | Piron........................... | 267/57.1 R |
| 2,226,435 | 12/1940 | Kolbe.......................... | 267/57.1 R X |
| 3,682,102 | 8/1972 | Pocklington................. | 105/199 S X |
| 3,101,938 | 8/1963 | Hirst............................. | 267/3 X |

FOREIGN PATENTS OR APPLICATIONS
411,622  6/1934  Great Britain..................... 267/57.1

Primary Examiner—Robert G. Sheridan
Assistant Examiner—Howard Beltran
Attorney—John J. McGlew et al.

[57] ABSTRACT

A torsional spring suspension for vehicles particularly an axle and cradle suspension for rail vehicles, comprises a linkage system extending between a supporting bracket on the undercarriage of the vehicle to the axle bearing housing which includes a spring element made up of a plurality of concentrically and alternately arranged metal and rubber or elastic material sleeves. The spring element includes at least one outer and one inner metal sleeve and the sleeves which are concentrically arranged are jointed together through the intermediate elastic sleeves. One of the sleeves is fixed to a housing by a non-rotatable connection and the other carries a swivel arm which provides the articulation for the support of the axle bearing.

11 Claims, 10 Drawing Figures

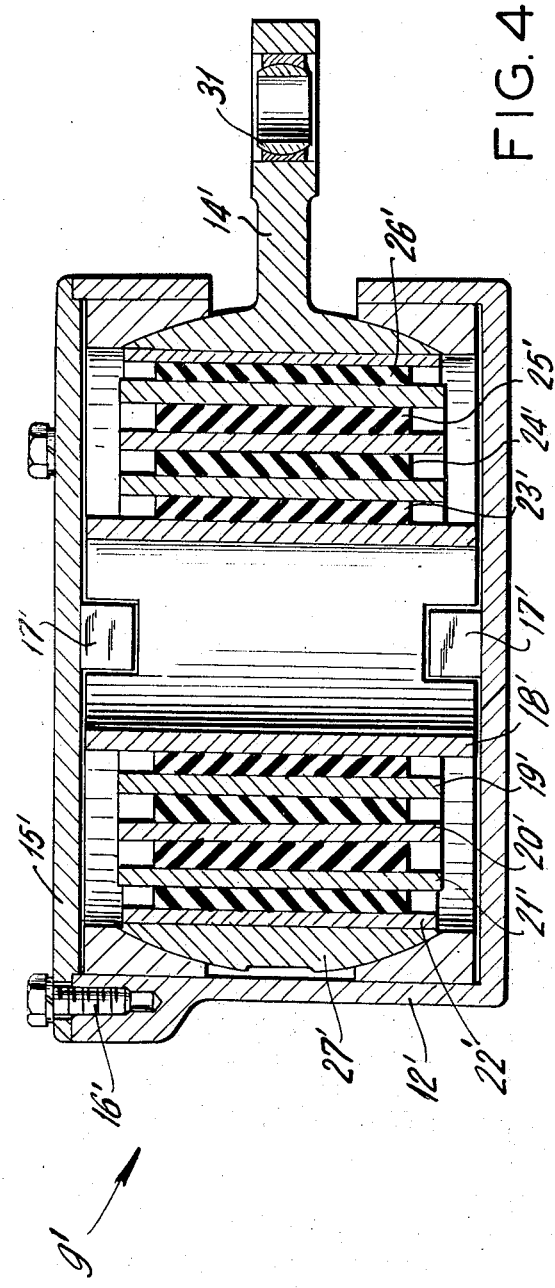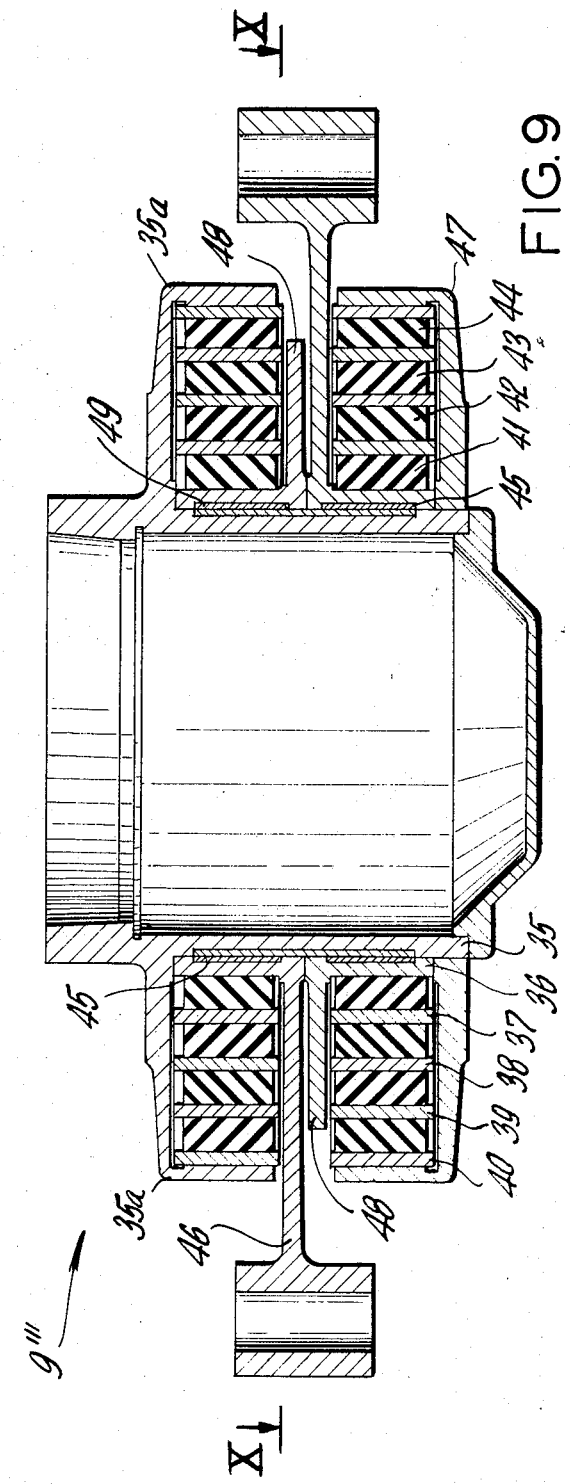

RAILWAY CAR SUSPENSION

BACKGROUND OF THE INVENTION

1. Field of the Invention

This invention relates in general to the construction of suspension systems and in particular to a new and useful suspension for vehicles particularly an axle suspension for rail vehicles in which the axle bearing housing is connected to the chasis through at least one elastic-metal spring which is secured either on the chassis or the axle bearing housing.

2. Summary of the Prior Art

The usual suspension systems used in rail vehicles comprising car leaf springs, coil springs or rubber metal springs have the disadvantage that their spring characteristics are laid out for the maximum admissible load of the vehicle so that the running properties and the suspension behavior are adversely influenced when the vehicles are running empty since these springs do not respond adequately at the low weight of the vehicle. It is not possible, for example, to maintain the bearing pressure necessary for the exact guidance of the wheels by the wheel flanges especially when the tracks are uneven and the vehicles are empty and when travelling at high speeds with these conventional springs so that the travelling and derailing safety factor is not ensured. In order to avoid the disadvantages of the known constructions it has been attempted to make suspensions in which the car leaf springs are designed as expanding springs so that only one or several of the upper spring leaves support the vehicle when it is empty and the other leaves come into action only with increasing load. The disadvantage of such design is that the upper leaf springs must perform a very large total suspension so that fatigue phenomena sets in very easily and the spring characteristic becomes readily adversely affected.

It is known to arrange auxiliary springs in the system so that deflecting of the springs is increased when the car is empty and there is a better adaptation of the wheels to the unevenness of the track and the necessary bearing pressure is maintained if the undercarriages are buckled. Auxiliary springs require, however, a greater expenditure and this is only justified in very rare cases. In the new construction of rail vehicles these auxiliary springs mean avoidable additional cost. In addition, additional damping would have to be provided.

It has also been tried to improve the suspension properties of the empty car by hydraulic or pneumatic suspension. All of the known solutions are too expensive and too delicate for the rough freight car operation and they are susceptible to trouble and they require excessive attendance.

SUMMARY OF THE INVENTION

In accordance with the invention there is provided a suspension for vehicles which includes a spring element having an elastic-metal spring particularly for the axle suspensions of the rail vehicles and which has a sufficient travel stroke reserve with maximum load of the vehicle and it has a favorable running characteristic to provide long travel strokes when the vehicle is empty, and, in addition, which permits an economical use of the suspension by providing a compact and uncomplicated construciton which avoids the disadvantages of the known embodiments.

The invention provides a suspension with a spring element disposed between the undercarriage and the axle bearing housing which comprises at least one outer and one inner metal sleeve in an assembly of several concentrically arranged sleeves which are separated by a vulcanized intermediate rubber layer. The individual metal sleeves are connected together by the vulcanized intermediate rubber layers and the inner sleeve or the outer sleeve is connected to a fixed location of the housing and the non-connected sleeve is provided with a swivel arm for the articulation of the suspension of the axle. The construction may be employed in an arrangement in which the housing of the spring is arranged on the chasis or on the cradle or on each side of the axle bearing housing and the inner sleeve is rigidly connected with the housing. With such a construction the housing has at least one detachable end face and at least one cam, preferably with a rectangular or trapezoidal or triangular base which is arranged on at least one end face of the spring housing.

With another arrangement the spring element is arranged concentrically to the axle bearing housing and it is split longitudinally and the housing embracing the spring elements is formed by angle flanges. Each swivel arm is connected to the inner sleeve of one part of the spring while the outer sleeves are rigidly connected with the angle flanges forming the housing. At least one preferably rectangular, trapezoidal or triangluar cam is arranged on each inner sleeve or the swivel arm is designed in its range outside the spring as a cam with an equal projection surface.

The invention provides a construction which can achieve any desired spring characteristic as a protection against overstress of the individual intermediate rubber layers or as an abut. In such an arrangement the inner metal sleeves arranged between the inner and outer metal sleeves of the rubber spring element or the metal sleeves arranged between the inner and outer metal sleeves are provided at the front with cutouts whcih are dimensioned so that the similarly cutout inner metal sleeves controls the cam of the housing preferably without play. The cutout of the other metal sleeves and the intermediate rubber layers are so dimensioned that the metal sleeves bear successively on the cams of the housing or on the sleeve under torsional stress of the rubber metal spring element when the travel stroke is exhausted.

The invention provides a compact protective spring element which requires very little space and which is characterized by a low weight which may be easily assembled and is absolutely attendent free. The spring is stressed exclusively for torsion. Irregular deformations by possible transmission of vertical normal forces do not appear. The main advantage, however, is that the characteristic of the spring can be laid out at random by corresponding selection of the number and size of the metal sleeves of the intermediate rubber layers and the hardness of the layers per spring element. Thus, for example, a spring can be laid out highly progressive so that long travel strokes are available with an empty car and the spring can be loaded by the weight of the car. The theoretically optimum spring characteristic can be achieved.

The running properties of a car could put the spring according to the invention at high speed or thus definitely improved.

According to a further feature of the invention it is possible to arrange between the outer metal sleeve and the inner wall of the housing or between the inner metal sleeve and the axle bearing housing a friction sleeve which is non-rotatably connected to the metal sleeve. This friction sleeve may be a single or multi-part friction coat. The swivel arm which is connected to the spring element is connected with the outer metal sleeve or the friction sleeve if the friction sleeve or the friction coat is arranged on the outer metal sleeve. This arragnement results in addition to the suspension, a load-dependent shock absorption which is also of advantage for the running properties of the car, since the material of the intermediate rubber layers must be provided with a low self-damping characteristic for technical reasons (this is very quick response to deformation and low heating). The surface of the spring housing or of the axle bearing housing which cooperates with the friction sleeve or the friction coating can be cylindrical or conical on either one or both sides, in the case that it is conical a pendulum is arranged between the swivel arm and the axle bearing housing or chassis.

The cooperating surfaces of the housing, the axle bearing housing and the friction sleeve or friction coating can also be spherical. In this case the swivel arm is also connected to the axle bearing housing or the chassis with an interposition of a pendulum attachment or is attached directly. With a cylindrical or conical form of the metal sleeve or of the friction coat and of the inner housing wall, a pendulum, for example, in the form of a link attachment is preferably provided to balance the transverse play of the axle. If these cooperating surfaces have a spherical form the link attachment can be eliminated. This embodiment is of advantage insofar as the transverse movements of the wheel are set and damped directly.

With the suspension construction of the invention in order to reduce the alteration cost in existing cars a yoke bearing on the axle bearing housing can be arranged between the pendulum attachment or link connection and the axle bearing housing or between the swivel arm and the axle bearing housing. A car with a conventional suspension, for example, leaf springs can then be re-equipped without any difficulty and with the suspension constructed in accordance with the invention. According to one embodiment the housing carries on its outside a base and it is connected through this base to the chassis or the axle bearing housing. In accordance with another embodiment the housings of the spring elements and the respective axle bearing housings form a single unit. The housings are secured to the right or left on the axle bearing housing by a casting, forging, pressing or by welding.

Accordingly it is an object of the invention to provide a suspension for vehicles particularly for the axle suspension of rail vehicles comprising linkage means connected between the axle and the undercarriage which includes a spring element having a plurality of concentrically and alternately arranged metal and rubber sleeves which are bonded together in an assembly which includes at least one inner and one outer metal sleeve, one of which is rigidly connected to a fixed housing part and the other of which is connected to a swivel arm for pivotally supporting the wheel bearing suspension.

A further object of the invention is to provide a suspension system for vehicles in which the outer metal sleeve carries a swivel arm which is connected to a spring support bracket through a connecting linkage, or the spring is arranged concentrically around the axle bearing housing and it is connected through a pivot arm through either the inner or outer sleeve of the assembly to the spring support bracket and either with or without a connecting link.

A further object of the invention is to provide a suspension spring construction which includes a spring housing having a side wall with a cam member and a plurality of alternately arranged metal and rubber sleeve elements contained within said housing, said housing having a cam formation extending through the portion of one end of said sleeve elements and holding said sleeve elements in respect to said housing, said sleeve elements being progressively arranged in respect to their abutment against said cam.

A further object of the invention is to provide a suspension system which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the drawing:

FIG. 4 is a view similar to FIG. 3 of another embodiment of the invention;

FIG. 9 is a section taken along the line IX—IX of FIG. 8; and

GENERAL DESCRIPTION OF THE PREFERRED EMBODIMENTS

Figure 1:
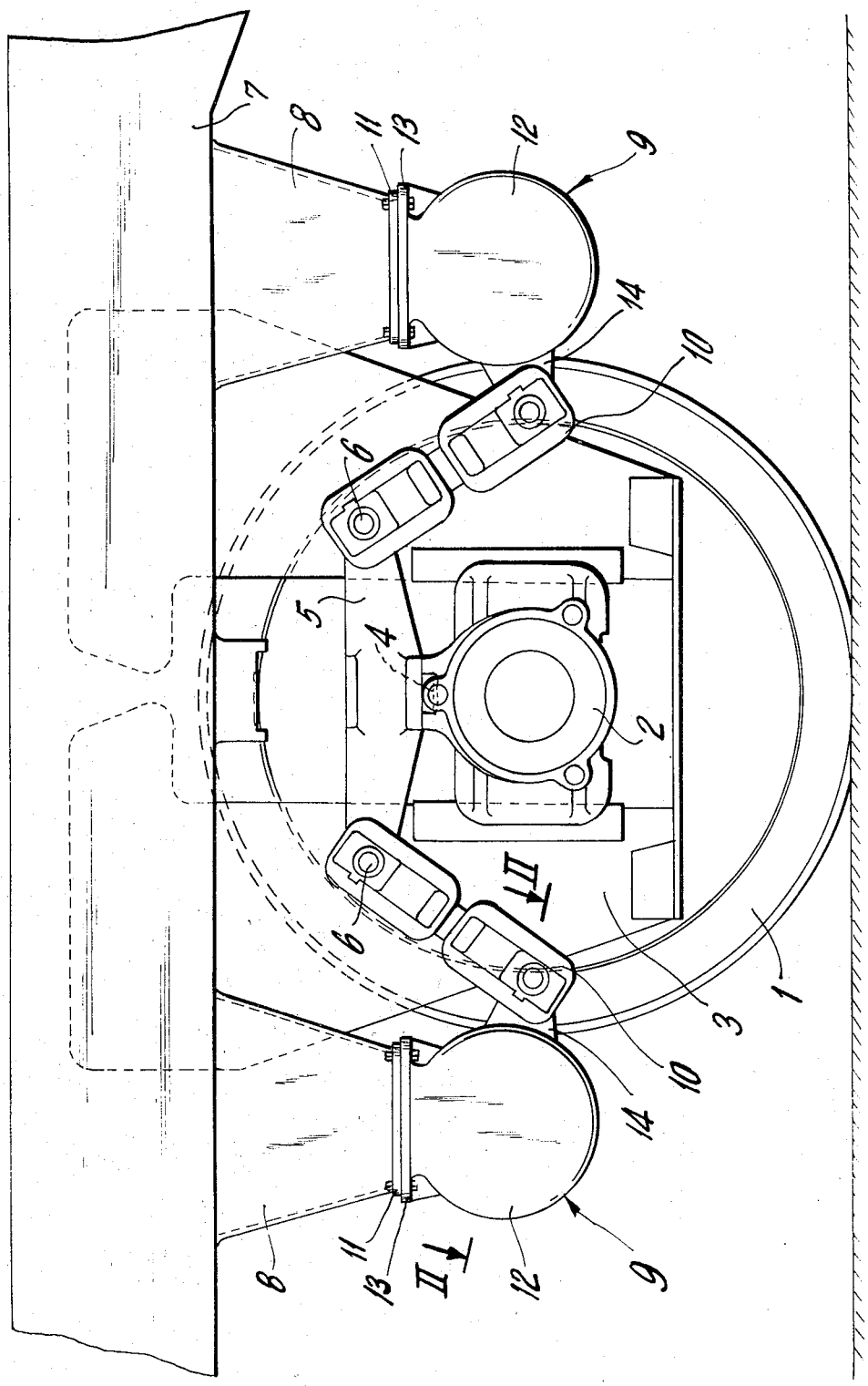
FIG. 1 is a side elevational view of a running gear of a railroad freight car having a suspension system constructed in accordance with the invention.
Figure 2:
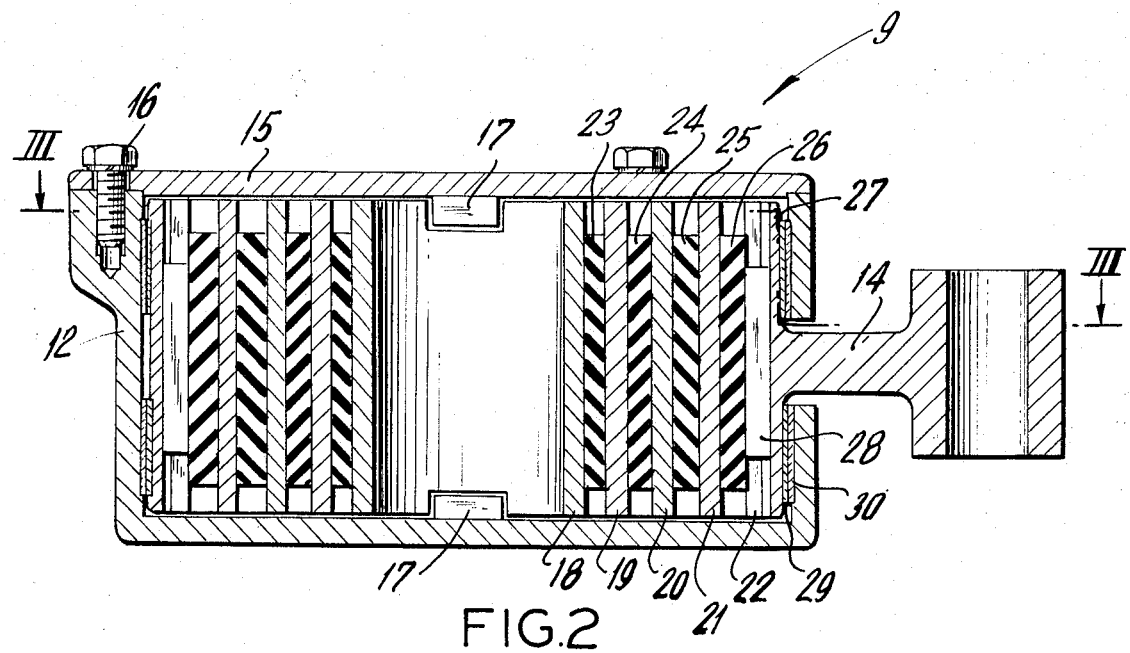
FIG. 2 is a section taken along the line II—II of FIG. 1.
Figure 3:
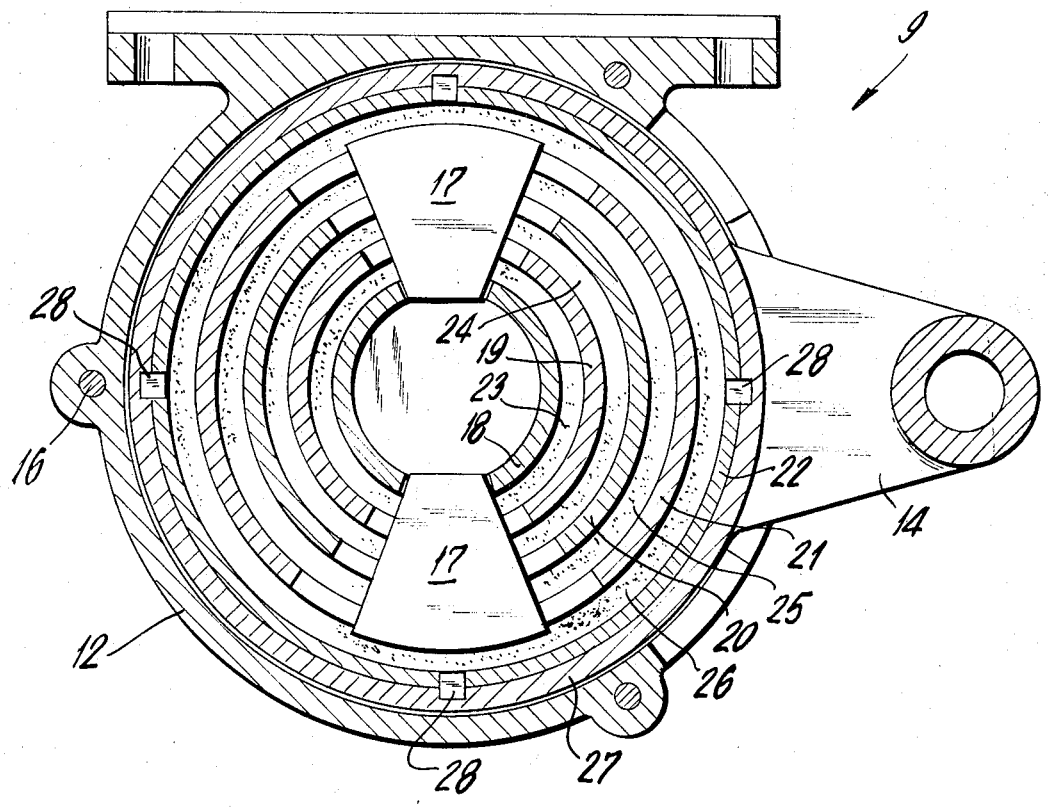
FIG. 3 is a section taken along the line III—III of FIG. 2.

Referring to the drawings in particular, the invention embodied therein as shown in FIGS. 1 to 3 comprises a wheel set 1 having an axle bearing housing 2 and an axle guard 3 in a conventional form for the arrangement of car leaf springs.

In accordance with the invention instead of the car leaf springs a yoke 5 is mounted with a journal 4 in the centering bore of the axle bearing housing 2. It carries at its free end eyes 6 corresponding to the spring eyes of a car leaf spring. The undercarriage 7 of the vehicle carries a depending spring bracket 8, 8 on each side of the wheel set 1. Each spring bracket 8 carries a spring element 9 which is constructed in accordance with the invention. The yoke 5 and the spring element 9 are connected through link attachments 10.

The spring brackets 8 correspond in respect to the construction of their bases with the spring brackets which are provided for the arrangement of car leaf springs. They are flattened, however, at their free end and provided with a connecting plate 11 extending parellel to the connecting surface of the spring bracket 8.

The spring elements 8 are preferably screwed on the connecting plate 11 over a housing base 13 of their housing bushing 12. The connection of the spring element 9 with the link attachement 10 is effected through a swivel arm 14 which projects out of the housing 12 and which is designed at its end which is connected to the link attachment 10 in the same manner as the end of a spring bracket for the arrangement of a car leaf spring.

As shown in FIGS. 2 and 3, the inner side of the housing is designed as a rotor and can be cylindrical as shown in FIG. 2, or even spherical as shown in FIG. 4, or it can be conical on one or two sides.

The spring element 9 includes a housing with an end face 15 which is detachable from a cup-shaped housing part 12, encloses the spring elements. Bolts 16 hold the detachable wall 15 in place. A flat cam 17 is arranged on an inner wall of the cup-shaped housing part 12 and on the wall part 15. The cams extend through grooves defined in the end faces of a spring assembly comprising a plurality of rubber-metal sleeve elements comprising a plurality of metal sleeves 18 to 22 with intermediate rubber layers 23 and 26. Each metal sleeve 18 to 21 has on its face cutouts which correspond in number and arrangement to the cams 17. The outer metal sleeve 22 can also be arranged without any cutout portion and located outside of the cam 17 as shown in FIG. 3.

The cutouts of the inner metal sleeve 18 embrace the cam 17 tightly from each side, preferably without play. The cutout portions of the other metal sleeves 19 and 21 are made large enough to provide some play in respect to the associated cams 17. The amount of this play depends on the selected spring characteristic. At the maximum it corresponds to the admissible travel stroke of the intermediate rubber layers under torsional stress of the spring. As shown in FIG. 3, the play increases in a radial outward direction to the outer sleeve which carries a pivot arm 14. The amount of play between the individual metal sleeves and the cams 17 determines the selected spring characteristic. The swivel arm 14 is carried on the outer metal sleeve 22 or on a friction sleeve 27 which is pushed over the outer metal sleeve 22 and connected non-rotatably therewith, and the outer end of the arm 14 is connected to a linkage attachemnt 10. When the spring is loaded through the swivel arm 14 the metal sleeves 18 to 22 are twisted toward each other since the inner metal sleeve 18 is mounted immovably in the housing 12 on the cams 17. The relative twist of the metal sleeves 18 to 22 toward each other is stepped due to the different cross sections of the intermediate rubber layers 23 to 26 so that the twist diminishes toward the outside. Due to the relatively small cross section of the inner intermediate rubber layers 23 long travel strokes are achieved even with small loads. When the travel stroke of the innermost layer 23 is exhausted the corresponding metal sleeve 19 bears against the cams 17, overloading of an intermediate rubber layer is thus avoided. With increasing load the respective next metal sleeves 20 to 22 in turn bear against the cams 17 so that a highly progressive spring characteristic rising slightly in steps is formed.

The outer metal sleeve 22 moves principally with each deflection of the spring element. In order to balance the deliberately low damping action of the intermediate rubber layers 23 to 26 against vibrations the invention utilizes these movements of the outer metal sleeve. On the outer metal sleeve 22 is provided for this purpose a rubber or metal sleeve 27 which is connected non-rotatably through wedges 28. Alternatively this sleeve and one or more multipart friction coating on the sleeve, such as a coating 29 cooperates with the inner surface of the housing 12 or with a friction coat 30 arranged on the housing. The spring element damps the vibrations of the wheel set 1 in the manner of a friction damper and effects a balance soft riding behavior of the car. The friction sleeve 27 or the friction coats 29 and 30 can comprise a wear-resistant hard metal or similar material. The damping action can be increased by a conical design of the inner housing wall and of the friction coatings 29 and 30 bearing negatively thereon or of the friction sleeve 27.

The surfaces of the sleeve can be spherical as indicated in FIG. 4. In this embodiment the corresponding parts of the other embodiment which are similar are shown with the same number with a prime. With a construction of this nature the link attachment 10 can be eliminated. The joint of the swivel arm 14 is preferably designed as a universal joint 31 or provided with a crowned bore or rubber-metal bushing to absorb buckling. In addition to the vertical vibrations of the wheel set 1, the horizontal vibrations are then also damped to an increasing extent.

Figure 5:
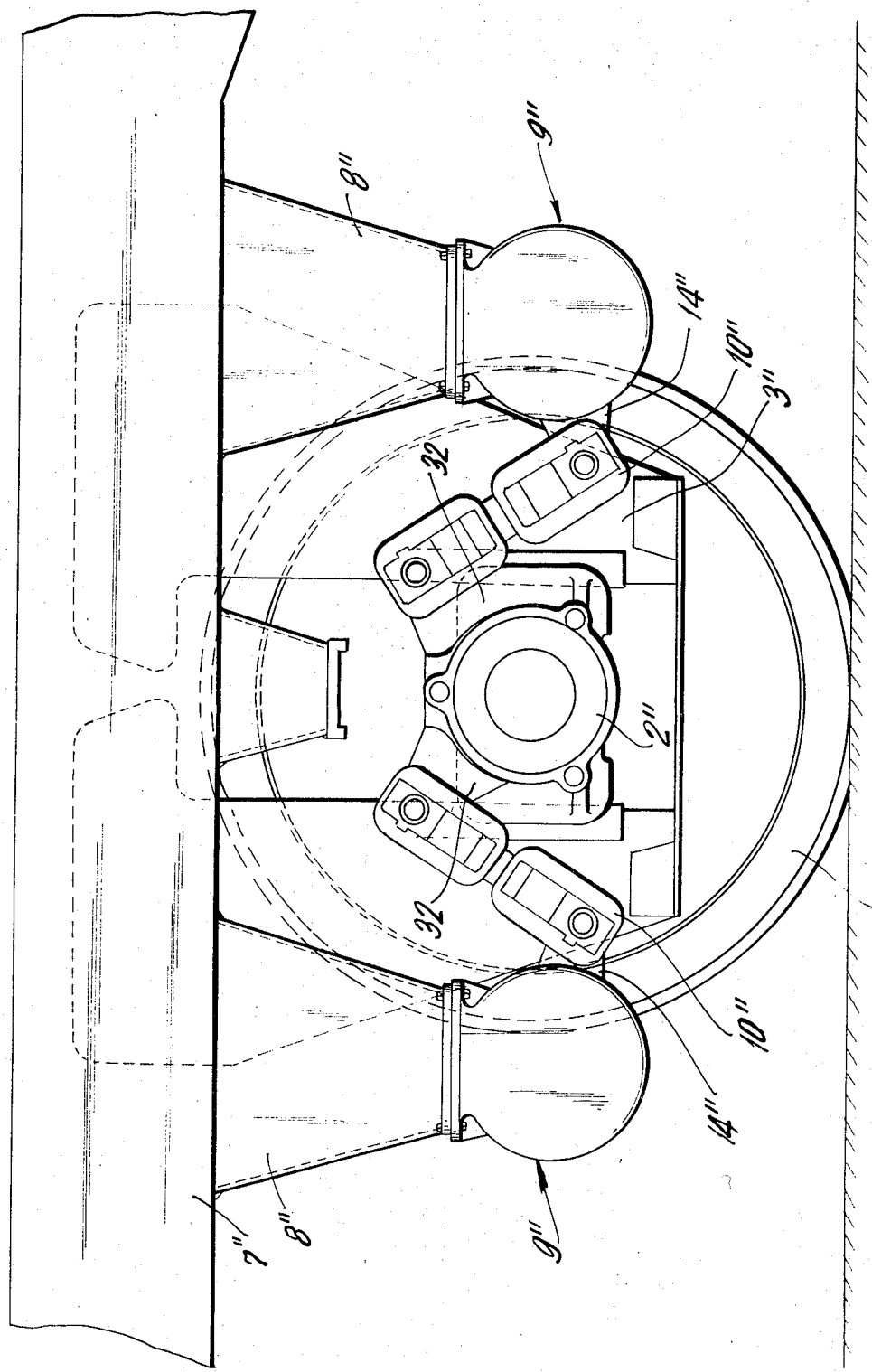
FIG. 5 is a view similar to FIG. 1 of another embodiment of the invention.
Figure 6:
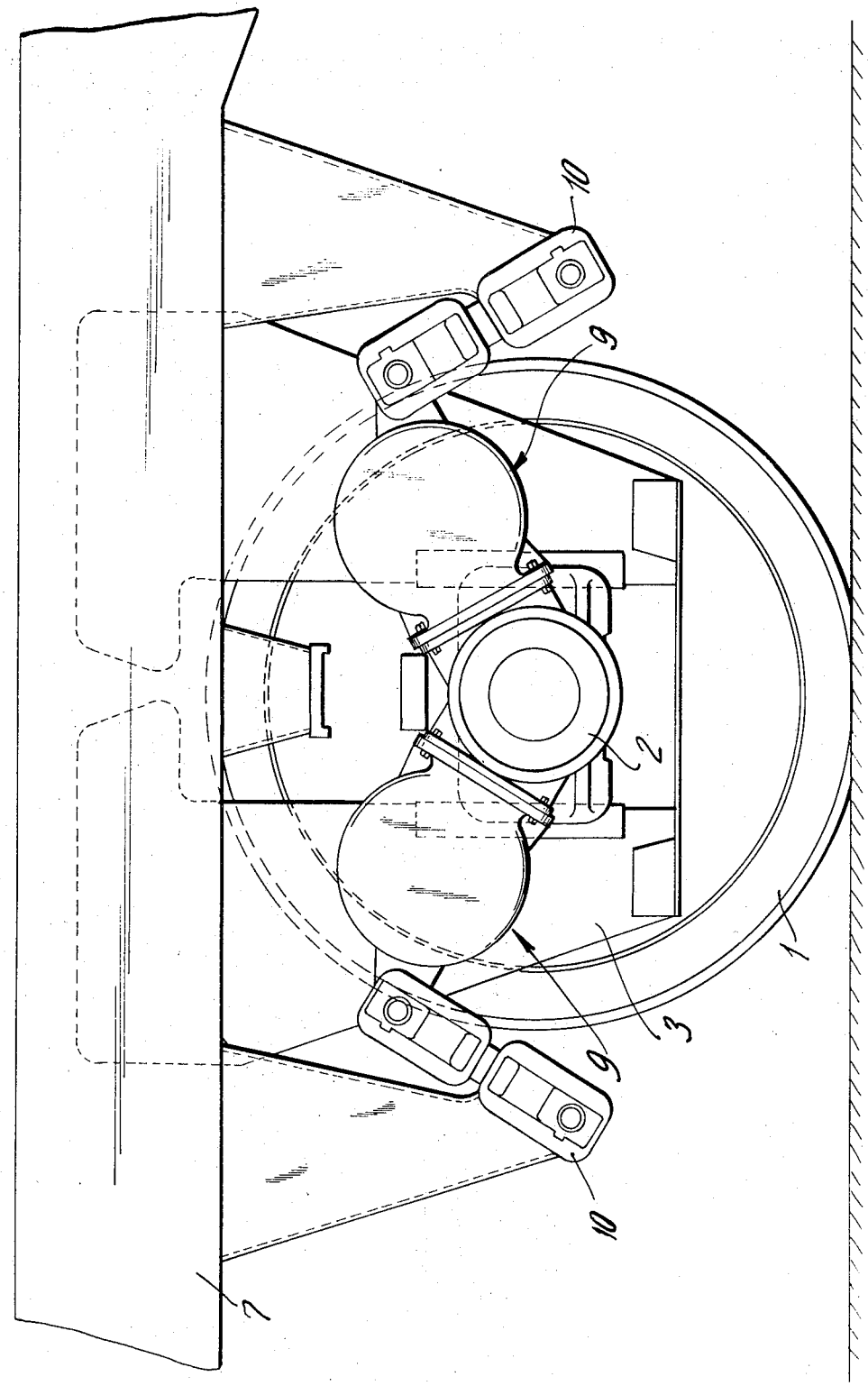
FIG. 6 is a view similar to FIG. 1 with another embodiment of the invention.

In a further embodiment of the invention as shown in FIG. 5 where corresponding parts are designated with a double prime, the axle bearing housing 2'' is provided with fastening eyes 32 for the link attachment 10'' and the swivel arms 14''. Likewise the spring element 9'' can be screwed on the axle bearing housing 2'' on the right and lefthand side thereof and secured on the bearing brackets through the link attachments 10'' or directly, so that the use of the normal spring brackets is possible. (see FIG. 6)

Figure 7:
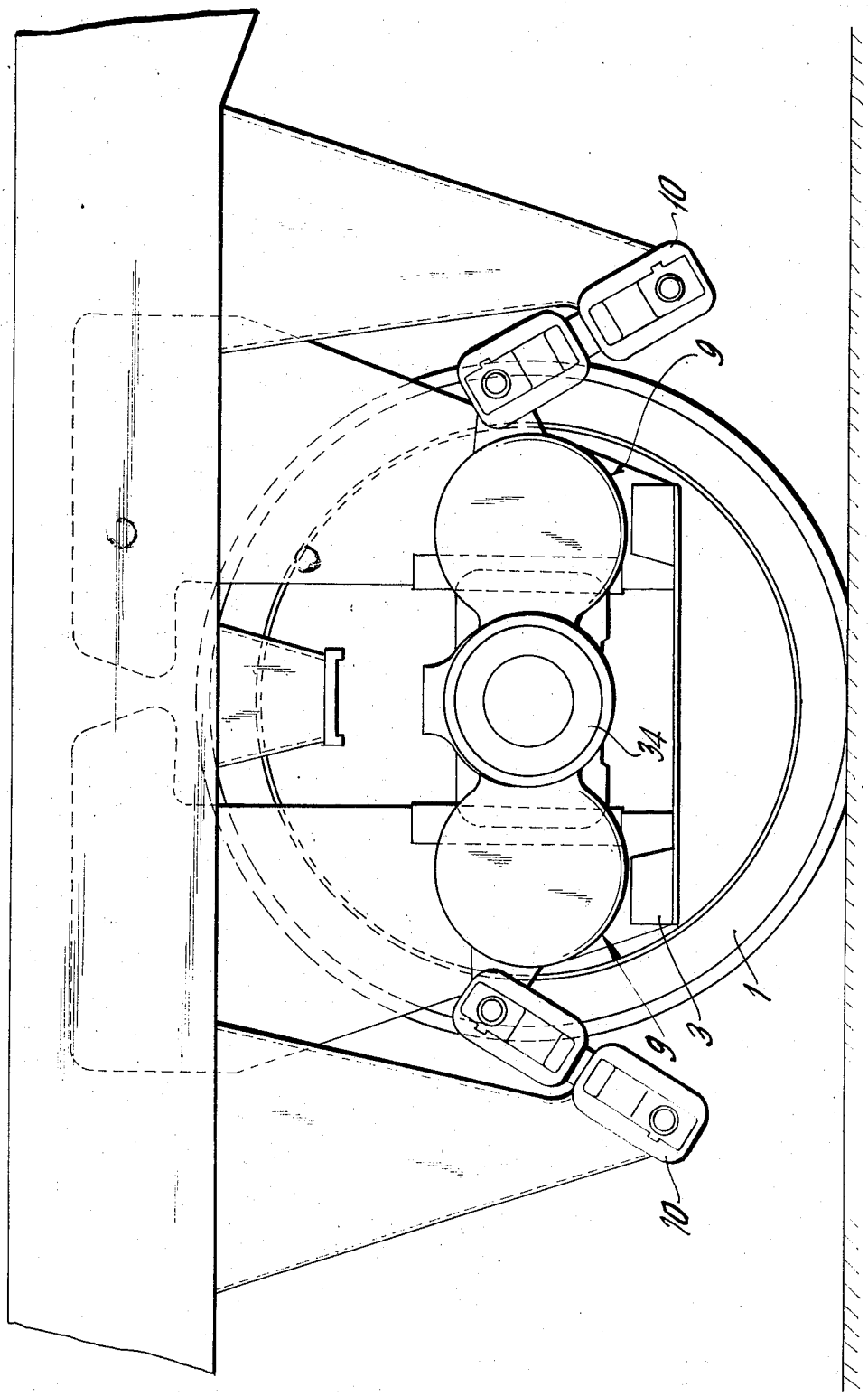
FIG. 7 is a view similar to FIG. 1 of a fourth embodiment of the invention.

As shown in FIG. 7, the axle bearing housing and the spring housing comprises a single element 34 and they are secured on the axle bearing housing by casting, forging, pressing or welding.

Figure 8:
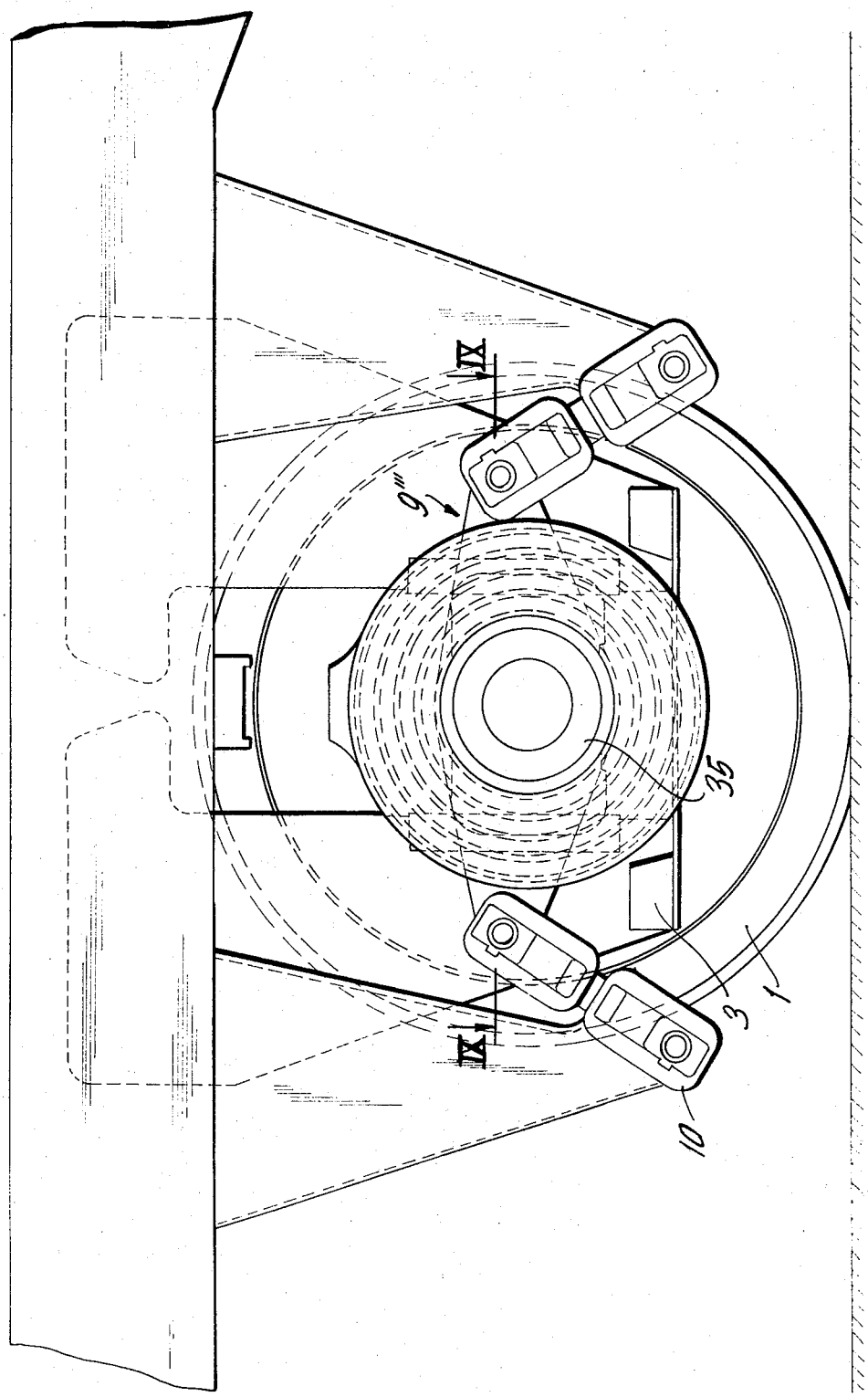
FIG. 8 is a view similar to FIG. 1 of a fifth embodiment of the invention.
Figure 10:
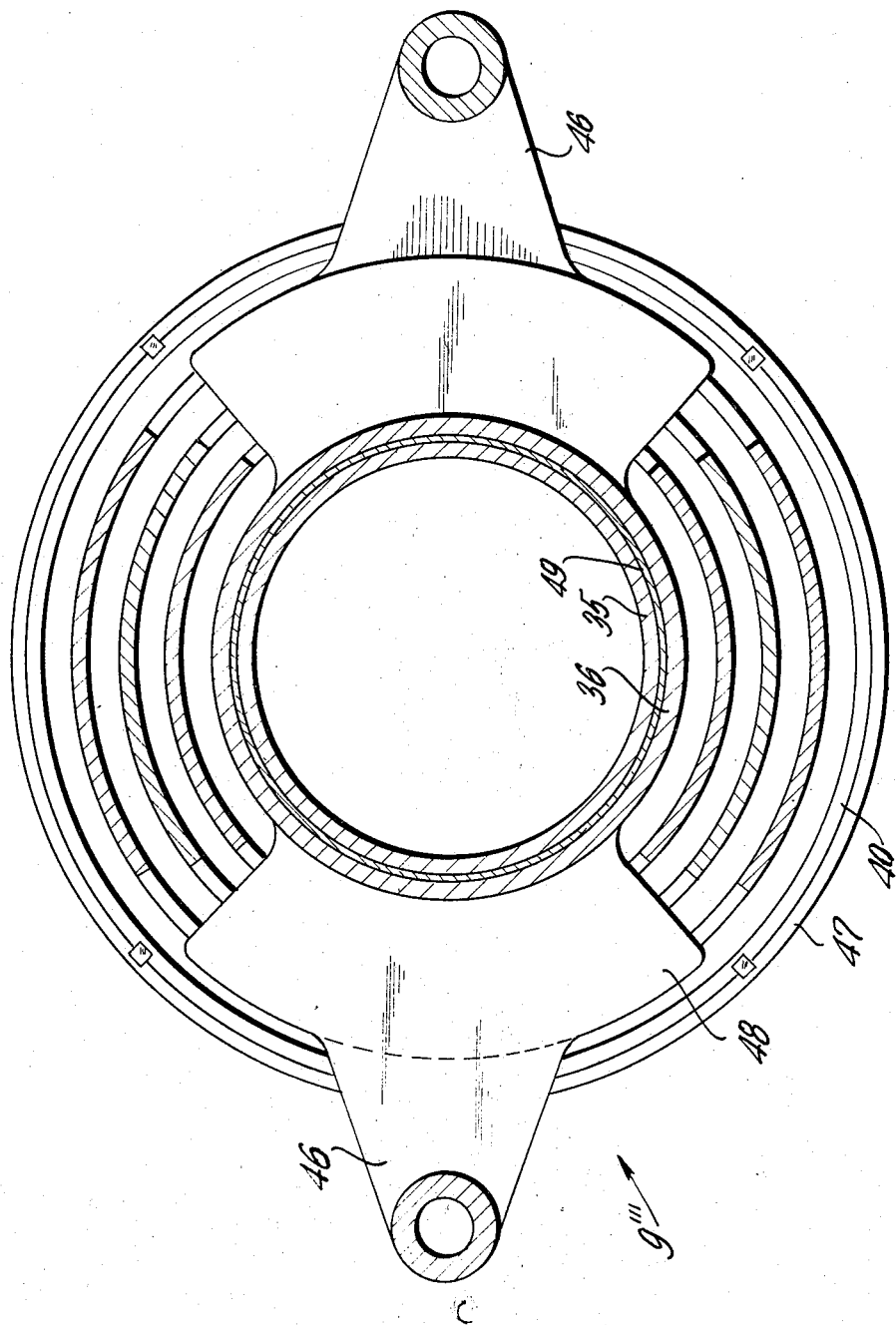
FIG. 10 is a section taken along the line X—X of FIG. 9.

In the embodiments of FIGS. 8 to 10 the spring elements 9'''' are concentrically arranged on the axle bearing housing, and for this purpose two metal rubber-metal spring elements are preferably arranged in series embracing the axle bearing housing 35 or the spring element is split lengthwise. These spring elements correspond in their design and action to the spring elements according to FIGS. 2 to 4. Their diameter is so selected that the inner metal sleeve 36 can be pushed over the round axle bearing housing 35. On the inner metal sleeve 36 are attached the rubber metal spring elements corresponding to the previous embodiment which comprise alternately metal sleeves 37 to 40 and intermediate rubber layers 41 to 44. In this embodiment friction coats 45 are inserted into the inner metal sleeve. According to another embodiment, which is not shown, a firction sleeve can also be arranged there.

On the inner metal sleeve 36 or on the friction sleeve connected non-rotatably therewith, the swivel arm 46 which corresponds to the swivel arm 14 is preferably arranged. The swivel arms are arranged radially opposite on the adjacent end faces of the inner metal sleeve 36.

The axle bearing housing 35 is provided at its one end facing the wheel set 1 with an angle flange 35a which embraces a rubber-metal spring element. On the front end of the axle bearing housing 35 is arranged another angle flange 47 in a non-rotatable manner. This embraces the second rubber-metal spring element. Th outer metal sleeves 40 of the spring elements are connected non-rotatably with the corresponding angle flanges 35a and 47. On the sides of the metal sleeves 36 which are radially opposite the swivel arms 46, there are arranged triangular, trapezoidal or rectangular cams 48 which cooperate or are located within cutouts of the metal sleeves 37 to 39. The part of the axle bearing housing 35 cooperating with the friction coats 45. The friction sleeves are also provided with friction coats 49. The friction sleeve 36 and also the friction coats 45 and 49 can also be conical, cylindrical or spherical. According to the invention the cams 48 can be eliminated in which case each swivel arm 46 is designed of a size corresponding to its range inside the rubber-metal spring elements, and it cooperates with the cutout portions of the sleeves 37 and 39.

While specific embodiments of the invention have been shown and described in detail to illustrate the application of the principles of the invention, it will be understood that the invention may be embodied otherwise without departing from such principles.

The embodiments of the invention in which an exclusive property or privilege is claimed are defined as follows:

1. A suspension for vehicles, particularly for axle and cradle suspensions for rail vehicles, having an undercarriage spring support bracket for the wheel axle bearing, comprising linkage means connected between the axle bearing and the undercarriage spring support bracket including a spring element having a plurality of concentrically and alternatingly arranged metal and intermediate rubber sleeves including at least one outer and one inner metal sleeve, said sleeves being jointed to each other through said intermediate rubber sleeves, a housing being non-rotatably connected to one of said outer and inner metal sleeves, and a swivel arm being connected to the other of said outer and inner sleeves for articulatively supporting said wheel axle bearing, said metal sleeves and said intermediate rubber sleeves having circumferentially extending cutout portions, a cam fixed to said housing and extending into the cutout portions of said metal sleeves and said rubber sleeves, said cam and the cutout portions being dimensioned to permit selective amounts of relative movement when said spring element is stressed between each sleeve and said cam before each sleeve engages against said cam.

2. A suspension according to claim 1, wherein said inner sleeve is rigidly connected to said housing, means mounting said housing on said spring support bracket, said housing having a detachable end face, and wherein said cam is defined at said end face connected to said inner metal sleeve.

3. A suspension according to claim 1, wherein said housing is concentrically arranged in respect to said wheel axle bearing, said spring element being split lengthwise, said swivel arm being connected to said inner sleeve and having a portion extending outwardly through each part of said split spring element, said housing embracing said spring comprising angle flanges connected to said outer sleeve.

4. An axle suspension according to claim 1 wherein said inner sleeve carries said swivel arm, said swivel arm defining said cam, said sleeves being dimensioned to have increasing clearance with said cam from the inner sleeve to the outer sleeve.

5. A suspension according to claim 1, including a friction sleeve connected non-rotatably to one of said sleeves between the outer and inner sleeves, and the inner wall of said housing.

6. A suspension according to claim 1, wherein said housing cooperating with said friction sleeve is cylindrical on at least one side and including a pendulum link attachment connected from said swivel arm to said axle bearing housing.

7. A suspension according to claim 1, wherein said housing and said axle bearing housing have cooperable surfaces with a friction surface thereon and are of spherical construction, and including a swivel arm having a pendulum attachment connected thereto and to said axle bearing housing.

8. An suspension according to claim 1, including a yoke mounted on said axle bearing housing, and a link pendulum attachment connected between said yoke and said swivel arm.

9. A suspension according to claim 1, wherein said spring support bracket includes a flat base portion, said spring housing having a base mounted on said flat base portion and being detachably connected thereto.

10. A suspension according to claim 1, wherein said spring element housing comprises the wheel axle bearing housing and being formed on each side of said bearing housing such as by casting, forging, pressing or welding.

11. A suspension for vehicles, particularly for axle and cradle suspensions for rail vehicles, having an undercarriage spring support bracket for the wheel axle bearing, comprising linkage means connected between the axle bearing and the undercarriage spring support bracket including a spring element having a plurality of concentrically and alternatingly arranged metal and intermediate rubber sleeves including at least one outer and one inner metal sleeve, said sleeves being jointed to each other through said intermediate rubber sleeves, a housing being non-rotatably connected to one of said outer and inner metal sleeves, and a swivel arm being connected to the other of said outer and inner sleeves for articulatively supporting said wheel axle bearing, said housing carrying a cam on an end wall connected to said inner sleeve, the sleeves extending outwardly from said inner sleeve having a cutout end portion into which said cam engages, said cutouts of the cams being progressively larger from the inner sleeve to said outer sleeve so that the sleeves progressively bear against the cam upon being turned by torsion on the load in a progression from the innermost sleeve toward the outermost sleeve to permit the innermost sleeve layers to become exhausted by torsion and bear against the cam while the others have not yet engaged the cam.

* * * * *